Patented Aug. 23, 1949

2,480,090

UNITED STATES PATENT OFFICE 2,480,090

FUNGAL LIPASE

Carl V. Smythe, Moorestown, N. J., and Billy B. Drake, Philadelphia, Pa., assignors to Röhm & Haas Company, Philadelphia, Pa., a corporation of Delaware No Drawing. Application February 21, 1946, Serial No. 649,378

5 Claims. (Cl. 195—66)

This invention relates to a stable and highly active lipase and to a method for its preparation.

Lipases have been detected in small amounts in animal tissues, in plant products such as the castor bean, and in nutrient media which have supported the growth of various bacteria and fungi. The amount of lipase has been increased in nutrient media supporting the growth of fungi by inclusion therein of oils or fats. But the lipases separated from such media have been relatively unstable even under conditions of refrigeration. The separation of lipolytic materials from such microbiological sources has been fraught with difficulties and the concentrates have all been of what proves now to be low activity. Furthermore, attempts to carry previously known laboratory methods to a larger scale of production have not met with success.

It has now been found that lipolytic enzymes, which are comparatively stable, which possess marked activity, and which may be provided on a large scale, are obtained by growing *Aspergillus luchuensis* on a moist nutrient medium composed of crushed or broken grains from which, preferably, part of the starchy material has been removed, including bran, shorts, and middlings, particularly from wheat, at temperatures from 25° to 35° C. and preferably from 28° to 35° C. In addition to wheat products, there may be used materials from rice, corn, oats, barley, and the like. While there may be added to such materials, if desired, fatty glycerides, such as olive oil, linseed oil, shark oil, etc., or seeds with high oil content, such as the soya bean, the yield of lipase is not dependent thereupon. With added oil the yield is usually considerably less for a short period of growth of the fungus, for in the presence of oil the formation of lipase seems to take place more slowly than on the nutrient medium alone, although with extended period of growth the lipase is not lost or deactivated in the presence of the oil.

Nutrient media are prepared by mixing the crushed or broken grain with water. Mixtures containing from 45% to 65% moisture are generally suitable, depending upon the specific materials used. With a mixture of wheat bran and middlings, a moisture content of about 55% to 60% has given the best results. It is advisable, though not essential, to sterilize the mixture by heating to eliminate bacteria and fungi which may chance to be present.

The mixture is then inoculated with a heavily spored culture of *Aspergillus luchuensis*, preferably at 0.05% to 0.2% of the culture medium by weight, and the inoculated medium maintained within the temperature range specified until the fungus has grown on the nutrient medium and sporulation has occurred. The best time for stopping the growth may be readily determined by making tests for lipolytic activity.

The optimum time of growth will depend upon the temperatures maintained. At about 30° C. the maximum lipase content develops within the first 90 hours on crushed grains. At lower temperatures longer times become necessary and at higher temperatures shorter times are generally desirable to secure maximum lipolytic activity.

Growth may be interrupted by drying the medium, preferably below 60° C. The dried product maintains its lipolytic activity for a long period of time and may be used as such. Alternatively, the medium, dried or undried, may be extracted and the extract used as a source of lipase. Furthermore, the extract may be treated with alcohol or salts or with both alcohol and salts, such as sodium sulfate or ammonium sulfate, and the enzymic material separated in the form of a solid, which may be isolated by filtering or centrifuging. The precipitated product may then be rinsed and dried at relatively low temperature, 40° C. to 80° C. being a suitable range, to give a stable lipase of high activity and excellent stability.

The lipase produced in accordance with this invention is water-soluble and is most effective at neutrality or in slightly acid solutions. Its activity is appreciably less at pH 7.5 and falls to a low level at pH 9.0. The enzyme is not destroyed at pH 9.0, however, and exhibits full activity when the pH is restored to 7.0. The optimum pH at which the lipase of this invention splits glycerides depends on the particular substrate but occurs at pH values of 5 to 7 in all cases examined. There is an apparent secondary peak of activity at a pH of about 4.5 with activity extending below pH 4. The lipase of this invention is effective over a rather wide temperature range, temperatures of 30° C. to 50° C. being particularly useful. The temperature at which optimum activity occurs is about 40° C. The dry concentrates or the dried cultures and the dried precipitates have been stored at room temperatures for several months and found to maintain their high lipolytic activity. The extracts have been stored at temperatures of 10° C. or less without any serious loss in activity.

In view of the fact that there is no standard unit for lipolytic activity, it became necessary to adopt arbitrarily a unit by means of which comparisons could be made. The unit adopted represents the number of milliliters of tenth normal acid which would be liberated from a given substrate in a fixed time by a gram of lipolytic material at 40° C. For most purposes olive oil is an excellent substrate and, when so used, the units may be referred to as olive oil units. It is, of course, necessary to hydrolyze the olive oil substrate at a given pH, preferably 7 in the case of the lipase of this invention, and to standardize other conditions. The substrate is used in an emulsified form, a 50% emulsion made with 2.5% of gum arabic being satisfactory. A 5 ml. portion of this emulsion is taken, buffered, and diluted with water. An aqueous solution of the enzyme material is made at such a concentration that 10 ml. thereof will cause hydrolysis of 15 to 50% of the oil in the substrate sample. The substrate sample and enzyme solution are mixed and kept at 40° C. for a definite time, for the standard test here 20 hours. At the end of this time the reaction mixture is chilled to interrupt enzymatic action and aliquot parts taken for titration. To these an alcohol-ether solution is added together with an indicator such as phenolphthalein, and the mixture is titrated with 0.1 n alkali. A control sample containing heat-inactivated enzyme is also titrated to determine the standard solution consumed by the system without enzyme action. The difference gives the acid produced by enzyme action. Calculation is now made of the amount of acid in terms of tenth normal solution which would be liberated by one gram of lipolytic material. In the determination of activities of cultures, as in the following examples, the evaluation of activities expressed in olive oil units is based upon dry material in order to place all determinations on the same basis.

*Example 1*

There were mixed about two parts by weight of bran and one part of soya bean meal and to these materials there was added an amount of water somewhat greater than the total weight of solids. The resulting mixture was heated in an autoclave to sterilize it and then cooled. Spores from a culture of *Aspergillus luchuensis* were added thereto in an amount approximately 0.05% by weight of the nutrient medium and thoroughly incorporated by stirring. The inoculated medium was then kept at 33°–35° C. for 16 hours and then at 28°–30° C. for 48 hours. An activity of 180 olive oil units was determined in samples of culture medium taken after 64 hours of growth. The culture was then dried with a current of dry air at about 50° C.

*Example 2*

Approximately 200 parts by weight were taken of wheat bran and 100 parts of wheat middlings and mixed with 400 parts of water. This mixture was then sterilized by heat and cooled. Thereupon, a heavily sporulated culture of *Aspergillus luchuensis* in an amount equal to 0.1% by weight of the above mixture was thoroughly dispersed therein. The temperature was raised to 35° C. for 16 hours to promote rapid growth of the fungus and then held for 48 hours at about 28° C. At this time samples of the culture medium were removed and showed an activity of 170 in olive oil units. The culture was then dried in a current of warm air. This dried product was extracted with water to give solutions of 14–16° Brix. Four volumes of ethyl alcohol were added per volume of extract. The precipitate which resulted was centrifugally settled, rinsed with alcohol, and dried in a current of warm air at 60° C. From 1600 parts of extract (by weight) there were obtained 81 parts of solid on a dry basis. The activity of this product was determined as 1350 at a pH of 7 against olive oil. It was proved to be stable by test.

*Example 3*

A mixture of two parts of bran and one part of middlings was treated with about an equal weight of water and 5% of its weight of rape seed oil. The resulting moist culture medium was sterilized with heat and cooled. It was then inoculated with 0.1% by weight of spores of *Aspergillus luchuensis* and maintained in a moist incubator at 30°–35° C. for 90 hours. The activity of the culture was thereupon determined and found to be 206 against olive oil. The culture was thereupon dried at about 50° C. to give a stable, highly potent source of water-soluble lipase.

*Example 4*

A mixture was prepared from 100 parts of wheat bran and 100 parts of middlings and thereto were added 10 parts of lactic acid (50%) and 280 parts of water. This medium was then sterilized by heating in an autoclave, cooled, and inoculated with about 0.08% of its weight of a well sporulated culture of *Aspergillus luchuensis*. The inoculated medium was maintained at 32°–35° C. for 16 hours and then for 49 hours at 28°–32° C. It was then dried at 45°–50° C. for 24 hours. The dried culture had an activity of 135 olive oil units. It was extracted with water to yield an extract of 17° Brix. The extract, treated with four volumes of alcohol per volume of liquid extract, gave a solid having an activity of 925 olive oil units.

*Example 5*

A medium was prepared from 220 parts of bran, 100 parts of middlings, 12 parts of 50% lactic acid, and 454 parts of water. After this medium had been sterilized, it was cooled and mixed with about 0.1% of its weight of a well sporulated culture of *Aspergillus luchuensis*, heated at 35° C. for 16 hours, and maintained at about 30° C. for 49 hours. The moist mass was then extracted with water to give a solution of 7.5° Brix. Sodium sulfate was dissolved therein until ten percent of the weight of the extract had been added. Alcohol was added until about four volumes of alcohol were present for each volume of original extract. A precipitate formed which was separated and dried. There were obtained 12.4 parts by weight from each 100 parts by volume. The product consisted of enzymes carried in precipitated salt. It had an activity of 290 olive oil units. This type of product appears quite stable when stored even at room temperature. The lipase of this invention may likewise be precipitated with sodium chloride to yield a useful, stable product.

In place of proportions of bran and middlings used in the above examples there may be used mixtures with greater or lesser proportions of one of these materials to the other. In a series of experiments the proportions were varied from 2 to 1 to 1 to 2 with activities being developed in all cases of 206 to 219 olive oil units for the dried cultures. Time of incubation and growth may likewise be considerably varied, 40 to 90 hours being generally suitable although considerably longer periods may be used, particularly when an acid or fatty acid glyceride is present to prevent building up of alkalinity.

Variations may be made in the nature of the culture medium, as has already been shown. It may be based on broken or crushed grains without removal of starchy material or resort to admixtures with relatively cheap shorts, bran, or middlings. It is preferred, however, that a bran, the broken coat of cereal grains, be admixed with whatever other crushed grain product may be selected to give a porous texture to the nutrient medium.

Another variation worthy of further comment is the use of soluble salts in the concentration or isolation of the enzymatic products. Soluble salts may be used not only in conjunction with a water-miscible organic solvent, such as alcohol, but may also be used as precipitating agents by themselves. Yet with any or all of these variations in procedure, there may be obtained by the practice of this invention lipase of exceptional activity and of good stability.

The lipases prepared by the method described above are useful in numerous processes which involve the splitting of fatty glycerides, the manufacture of certain cheeses, in the preparation of vitamins from fish oils, in certain laundering operations, etc. By the disclosed method there are available for the first time preparations which are of high lipolytic activity, which retain this activity on storage, and which may be prepared on a commercial scale.

We claim:

1. A method of preparing lipolytic enzymes of high activity and good stability which comprises inoculating a moist culture medium, comprising broken grain from which part of the starchy material has been removed, with the spores of *Aspergillus luchuensis* and incubating said spores at about 25° C. to about 35° C. until the culture medium shows lipolytic activity of at least 135 olive oil units.

2. A method of preparing lipolytic enzymes of high activity and good stability which comprises inoculating a moist culture medium comprising crushed grain with spores of *Aspergillus luchuensis*, incubating said spores at about 25° to about 35° C. until the culture medium shows a lipolytic activity of at least 135 olive oil units, and interrupting the growth of said fungus.

3. A method of preparing lipolytic enzymes of high activity and good stability which comprises inoculating a moist culture medium, comprising broken grain from which part of the starchy material has been removed, with the spores of *Aspergillus luchuensis*, incubating said spores at about 25° C. to about 35° C. until the culture medium shows a lipolytic activity of at least 135 olive oil units, and interrupting the growth by drying below 60° C.

4. A method of preparing lipolytic enzymes of high activity and good stability which comprises inoculating with the spores of *Aspergillus luchuensis* a moist culture medium, comprising broken grain from which part of the starchy material has been removed and containing 45% to 65% of moisture, incubating said spores on said culture medium at about 25° C. to about 35° C. until the culture medium shows a lipolytic activity of at least 135 olive oil units, interrupting the growth by drying below 60° C., extracting the culture with water, precipitating the enzymes from the resulting extract by adding alcohol, separating and drying the precipitated enzymes at 40° to 80° C.

5. A method of preparing lipolytic enzymes of high activity and good stability which comprises inoculating with the spores of *Aspergillus luchuensis* a moist culture medium, comprising broken grain from which part of the starchy material has been removed and containing 55% to 60% of moisture, incubating said spores on said culture medium at about 25° C. to about 35° C. until the culture medium shows a lipolytic activity of at least 135 olive oil units, extracting the incubated culture with water, precipitating the enzymes from the resulting extract by adding alcohol, separating and drying the precipitated enzymes at 40° C. to 80° C.

CARL V. SMYTHE.
BILLY B. DRAKE.

REFERENCES CITED

The following references are of record in the file of this patent:

UNITED STATES PATENTS

| Number | Name | Date |
|---|---|---|
| 1,687,050 | Yamamoto | Oct. 9, 1928 |

OTHER REFERENCES

Stuart, J. Bact. 29, 88–9, 1935.

Chemical Abstracts, 30:6397[6]. Soluble enzyme secreted by a. fumigatus. S. Mihaeloff., Bull. Inst. Egypti. 17 (1935).

Chemical Abstracts, 26:5608[9]. Cultural Studies on Aspergillus with special reference to lipase production. I. C. Eyre. Ann: Applied Biol. 19 (1932).

Chemical Abstracts, 15:3654[1]. Lipase from A. niger, van Tregh. Robert Schenker, Univ. Basel. Biochem. Z. 120 (1921).